Fig. 1

Inventor
Isadore Irving Pinkel

Inventor
Isadore Irving Pinkel

Jan. 31, 1950  I. I. PINKEL  2,495,760
ROTARY PUMP FOR HIGH-ALTITUDE AIRCRAFT
Filed May 17, 1946   6 Sheets-Sheet 3

Inventor
Isadore Irving Pinkel
By
Attorney

Jan. 31, 1950        I. I. PINKEL        2,495,760
ROTARY PUMP FOR HIGH-ALTITUDE AIRCRAFT Filed May 17, 1946        6 Sheets-Sheet 4

Inventor
Isadore Irving Pinkel

By
Attorney

Patented Jan. 31, 1950

2,495,760

UNITED STATES PATENT OFFICE 2,495,760

ROTARY PUMP FOR HIGH-ALTITUDE AIRCRAFT

Isadore Irving Pinkel, Cleveland, Ohio

Application May 17, 1946, Serial No. 670,407

22 Claims. (Cl. 103—5)

(Granted under the act of March 3, 1883, as amended April 30, 1928; 370 O. G. 757)

This invention relates to a rotary positive displacement pump for liquids, including those of sufficiently high viscosity to be classified as pastes, liquids saturated with dissolved gases, liquids in which large quantities of gases are entrained, liquids having high vapor pressures or in the boiling conditions, and gases.

Existing rotary positive displacement pumps are unsuited for pumping liquids saturated with dissolved gases, and/or bearing entrained gases, and/or having high vapor pressure, because the drop in pressure between the fluid flowing to pump and the pump chambers required to maintain a sufficient flow of fluid to fill the pump chambers is so great as to cause an appreciable evolution and expansion of gases and vapors in the pump chambers. These gases and vapors displace an equal volume of liquid from the pump chambers, and the pump delivery rate is reduced accordingly. The situation described becomes more acute as the absolute pressure of the pump intake liquid is reduced below that necessary to establish the pumping pressure drop required for overcoming the high resistance to flow into the pump chambers. This often occurs during high-altitude flight with aircraft oil, fuel, and coolant pumps, and in vacuum distillation service with vacuum receiver pumps which serve to remove the products of distillation from the low-pressure receivers.

It is therefore an object of the present invention to construct a positive displacement pump for use at low pump intake pressures with liquids containing dissolved and/or entrained air, and/or having high vapor pressure, which pump shall not return fluid that has been subject to pump delivery pressure back to the pump inlet. The large drop in pressure experienced by this fluid results in a great evolution and expansion in volume of gases and vapors from the liquid at the pump inlet, or in the pump chambers, which prevented an equivalent volume of fluid from flowing into the pump. This characteristic of pumps is known to the pumping art as high volumetric efficiency.

A further object is to construct a novel rotary positive displacement pump which requires considerably less pressure drop between the fluid flowing to the pump and the pump chambers than is required by existing pumps of the same flow capacity, and which has a high volumetric efficiency, so that high viscosity liquids, and liquids with high vapor pressure and/or containing entrained and/or dissolved gases, can be pumped with ease at low pump inlet pressures.

Another object of my invention is to provide a small rotary positive displacement pump of extremely high flow capacity at moderate pump rotational speeds. This property of the pump is of particular advantage in aircraft applications where space and weight are principal considerations.

Another object of this invention is to provide a rotary positive displacement pump in which the moving parts are so related that the rate of wear is low.

The following description and drawings show two embodiments of this invention.

Figure 7:
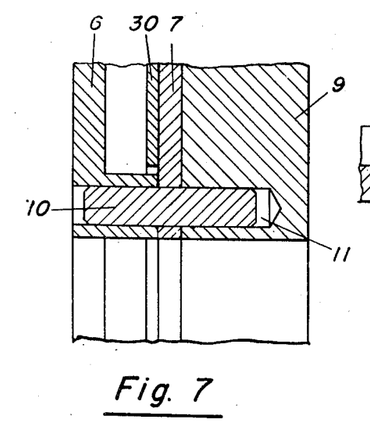
Fig. 7 is a detail sectional view along line 7—7 of Fig. 6.
Figure 8:
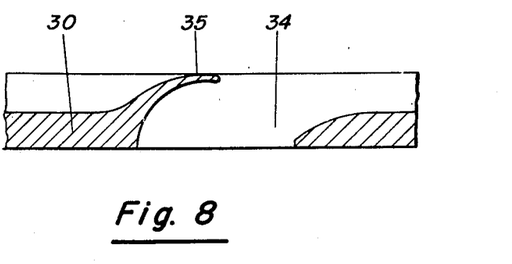
Fig. 8 is a detail sectional view taken along line 8—8 of Fig. 6.

With reference to Figs. 1 to 8, the pump casing 1 is provided with flange 2, cylindrical body 3, boss 4, bearing surfaces 51 and 52, and discharge pipe 5. Stator retaining plate 6 (Figs. 1 and 6) is bolted to flange 2 of pump casing 1. Annular bearing 53 (Fig. 1) is rigidly attached to stator retaining plate 6. Stator rings 7 and 8 (Figs. 1, 5 and 3) are fastened rigidly to lands 9 (Fig. 2), and the stator assembly, comprising said stator rings 7 and 8, and lands 9, is held in place within casing 1 by pins 10 (Figs. 2, 5, 6, and 7), which are rigidly fastened to stator retaining plate 6 and extend into holes 11 in stator rings 7 and land 9 (Fig. 7). Cylindrical rollers 12 (Fig. 2) are provided with pockets 13 and are rotatably mounted in stator rings 7 and 8 by means of roller shafts 14 rigidly fixed to cylindrical rollers 12, which are extensions of the axis of cylindrical rollers 12 into stator ring bearings 15 and 16 (Fig. 1) suitably bushed with bearing material. Lands 9, stator rings 7 and 8, and cylindrical rollers 12 are formed to provide close tolerances with only sufficient clearance to permit rotation of said cylindrical rollers 12 with respect to said stator rings 7 and 8 and lands 9 in order to minimize fluid leakage between adjacent surfaces of these parts.

Figure 1:
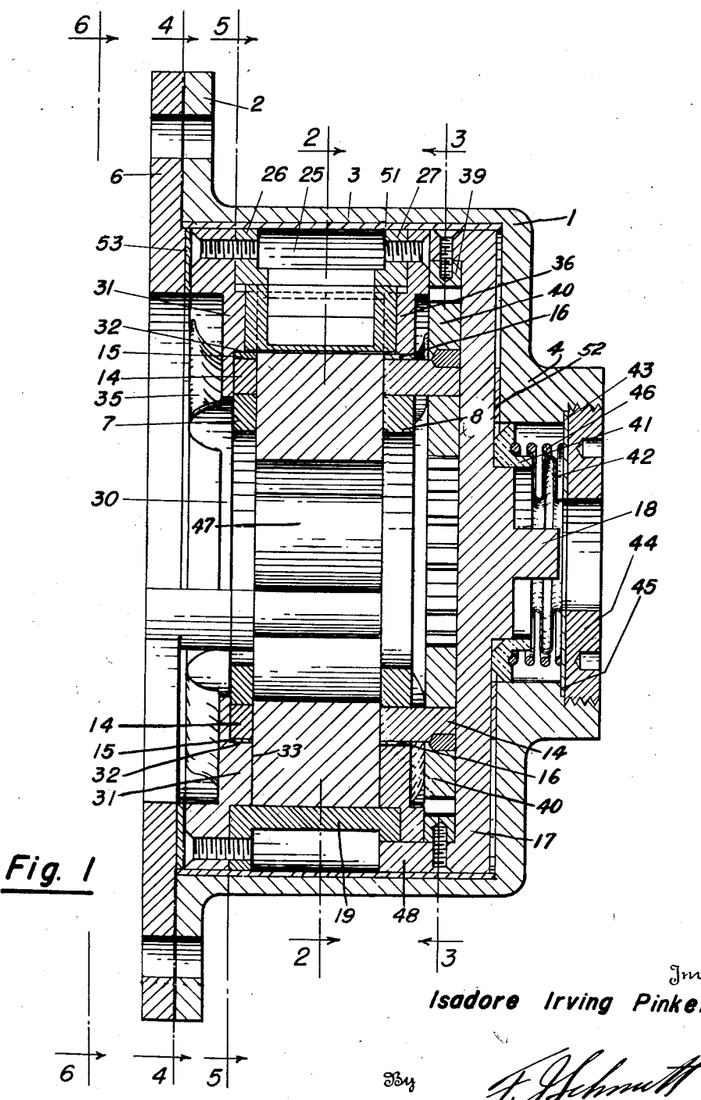
Fig. 1 is a cross-sectional view of one embodiment of this invention.

Drive plate 17 (Fig. 1) is rotatably mounted in pump casing 1, and is provided with drive shaft 18, to which may be attached any desired driving means. Impeller ring 19 (Fig. 2) is fastened to drive plate 17 for rotation with said drive plate by means of three driving lugs 48, one of which is shown in Fig. 1. These lugs engage sockets 49 (Fig. 2) in impeller-ring flange 27 (Figs. 1 and 2), which is integral with impeller ring 19. Driving lugs 48 conform with close tolerance to the form of sockets 49 so that leakage of fluid between them is at a minimum. Impeller ring 19 is proportioned and located so that the impeller-ring inner surface 20 (Fig. 2) moves substantially tangentially to the cylindrical surfaces 21 of cylindrical rollers 12 when drive plate 17 is rotated. The clearance between impeller-ring inner surface 20 and cylindrical roller surfaces 21 is a minimum to avoid leakage without introducing excessive friction. Impeller ring 19 is provided with rigidly attached impeller teeth 22 (Fig. 2), equally spaced on impeller ring 19, said impeller teeth 22 containing teeth channels 23. Teeth-channel openings 24 in impeller teeth 22 are on the side of the teeth facing the direction of rotation of impeller ring 19. Teeth channels 23 are in flow communication with impeller-ring discharge channel 25 (Figs. 1 and 2), formed between impeller ring 19 and casing 1 and impeller-ring flanges 26 and 27 (Fig. 1). Impeller-ring discharge channel 25 is in flow communication with discharge pipe 5 in pump casing 1.

Impeller teeth 22 are adapted to mesh with pockets 13 in cylindrical rollers 12 in close contact with the walls of the pocket 13 to minimize leakage of fluid between the teeth edges 28 and walls of pockets 13. The lands 9 and the teeth 22 are also arranged for close association to provide a minimum of fluid leakage between outer periphery 50 of land 9 and teeth ends 28 (Fig. 2) consistent with low friction between these elements.

Scoop plate 30 (Fig. 1) is rigidly fastened to impeller-ring flange 26 in a leakproof manner for rotation with impeller rings 19, and is provided with an annular shoulder 31 (Figs. 1 and 5), the inner periphery 32 of which is in close proximity to outer periphery of stator ring 7. The annular shoulder face 33 (Fig. 1) is in close proximity to one end of cylindrical rollers 12 and impeller teeth 22, whereby there is a minimum of clearance for fluid leakage, consistent with low friction, between the faces of annular shoulder 31 and the adjacent surfaces of cylindrical rollers 12, impeller teeth 22, impeller ring 19, and stator ring 7. Scoop plate 30 is provided with intake ports 34 (Figs. 4, 5, and 6) and scoops 35 (Figs. 1, 4 and 8) that extend in the direction of rotation to provide ramming of fluid into the intake ports when the scoop plate 30 is rotated.

Scoop plate 36 (Figs. 1 and 3) performs the same function as scoop plate 30, but is modified to permit cylindrical roller shaft 14 to project beyond stator ring 8 to drive plate 17. Scoop plate 36 is rigidly attached to impeller-ring flange 27 and rotates with it. Scoop plate 36 is provided with intake ports 37 (Fig. 3) and scoops 38 (Figs. 2 and 3), which extend in the direction of rotation to provide ramming of fluid into the intake ports 37 when the scoop plate is rotated.

Internal gear 39 (Figs. 1 and 3) is rigidly bolted to drive plate 17 and rotates with said drive plate 17. Roller spur gears 40, (Figs. 1 and 3) are rigidly mounted on cylindrical roller shafts 14 and are adapted to mesh with internal gear 39 to provide proper timing of the rotations of cylindrical rollers 12 to permit smooth passage of impeller teeth 22 by the pockets 13 in cylindrical rollers 12. It is noted that the surfaces of lands 9, cylindrical rollers 12, impeller teeth 22, and scoop plates 30 and 36 cooperate to form pump chambers $a$, $b$, $c$, and $d$ (Fig. 2), which vary in size as the impeller ring 19 is rotated with respect to the stator rings 7 and 8. The intake ports in scoop plates 30 and 36 are proportioned so that when any given impeller tooth 22 in passing through pocket 13 of a cylindrical roller 12 just establishes flow communication between tooth channel 23 and a pump chamber, as pump chamber $a$ in Fig. 2, then intake ports 34 and 37 just preceding said tooth 22 in the direction of rotation just cease flow communication with the same pump chamber $a$ by virtue of having passed into close proximity with a cylindrical roller 12 (see Figs. 2 and 4).

Referring to Fig. 1, any standard or desired liquid seal can be provided between drive plate 17 and pump casing 1 in boss 4. There is shown a bronze ring 41 attached in a leakproof manner to metal bellows 42 and metal bellows 42 is attached in a leakproof manner to metal disk 43. Gland nut 44, adapted to screw into boss 4 of casing 1, forces metal disk 43 into shoulder 45 in boss 4 to provide a stationary seal between boss 4 and metal disk 43. A spring 46 under compression between bronze ring 41 and metal disk 43 provides additional force on the rotating seal between bronze ring 41 and drive plate 17.

The following is the method in which this pump operates. In operation, the pump is immersed in the liquid to be pumped, or a pipe is provided to bring the fluid to be pumped to the face of the scoop plate 30. The fluid flows to the face of scoop plate 36 through passage 47 (Figs. 1 and 2) in stator rings 7 and 8 and lands 9. Rotation of drive shaft 18 by any desired means causes rotation of drive plate 17, impeller ring 19, impeller teeth 22, scoop plates 30 and 36, internal gear 39, roller spur gears 40, and cylindrical rollers 12. It is noted that the axis of rotation of cylindrical rollers 12 is fixed with respect to stator rings 7 and 8, and therefore, does not move. Rotation of scoop plates 30 and 36 causes hydraulic ramming of liquid into intake ports 34 and 37, respectively, and thence into those pump chambers of the set $a$, $b$, $c$, $d$ (Fig. 2), with which said intake ports 37 and 34 are in flow communication.

Figure 2:
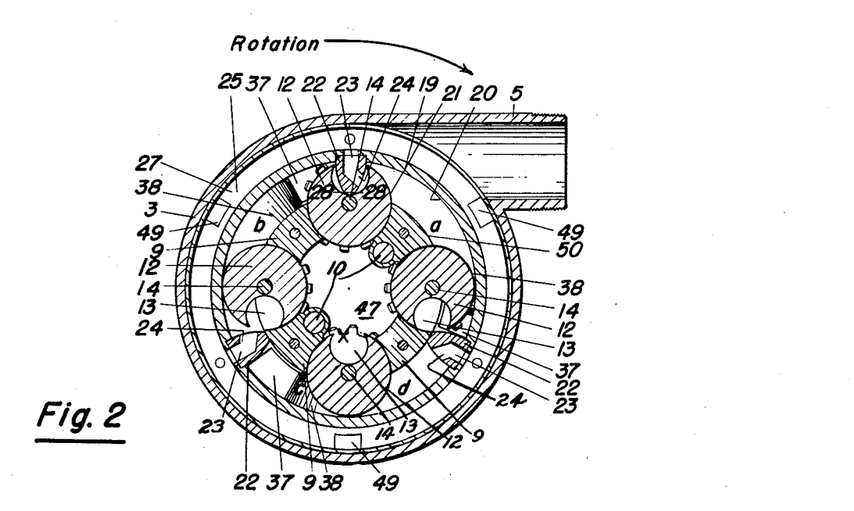
Fig. 2 is a view taken along the line 2—2 of Fig. 1.
Figure 3:
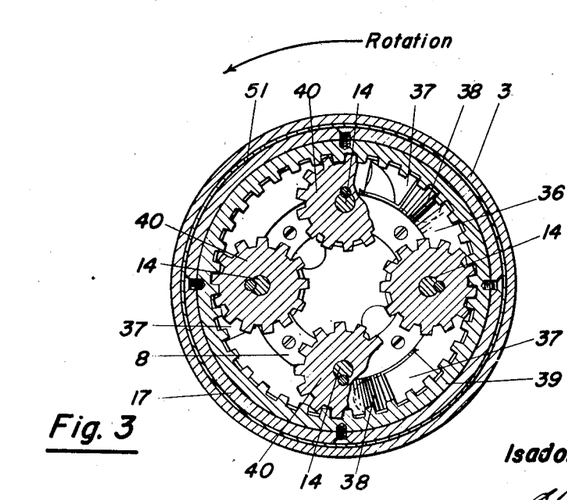
Fig. 3 is a sectional view along line 3—3 of Fig. 1.

A cycle of events takes place within the pump chambers. In Fig. 2 the several pump chambers are shown in various stages of the pumping cycle. For example, pump chamber $d$ is not in flow communication with any intake port (see Fig. 4), and as impeller tooth 22 bounding this pump chamber moves in the direction of rotation it decreases the pump-chamber volume and the liquid in pump chamber $d$ is forced to flow through tooth channel 23 (Fig. 2), and impeller ring discharge channel 25 into discharge pipe 5. In pump chamber $a$ (Fig. 2) it is seen that intake ports 34 and 37 (Figs. 2 and 4) are just about to cease flow communication with pump chamber $a$, and tooth channel 23 in impeller tooth 22 is just about to commence flow communication with pump chamber a. In pump chamber c it is seen that intake ports 34 and 37 (Figs. 2 and 4) are in flow communication with the pump chamber while there is no tooth channel 23 in any impeller tooth 22 in flow communication with said pump chamber c. Motion of the impeller tooth 22 in the direction of rotation is seen to cause an increase in the volume of pump chamber c and create a suction thereby, which draws fluid into the pump chambers through the intake ports 34 and 37 in flow communication with this pump chamber.

Figure 4:
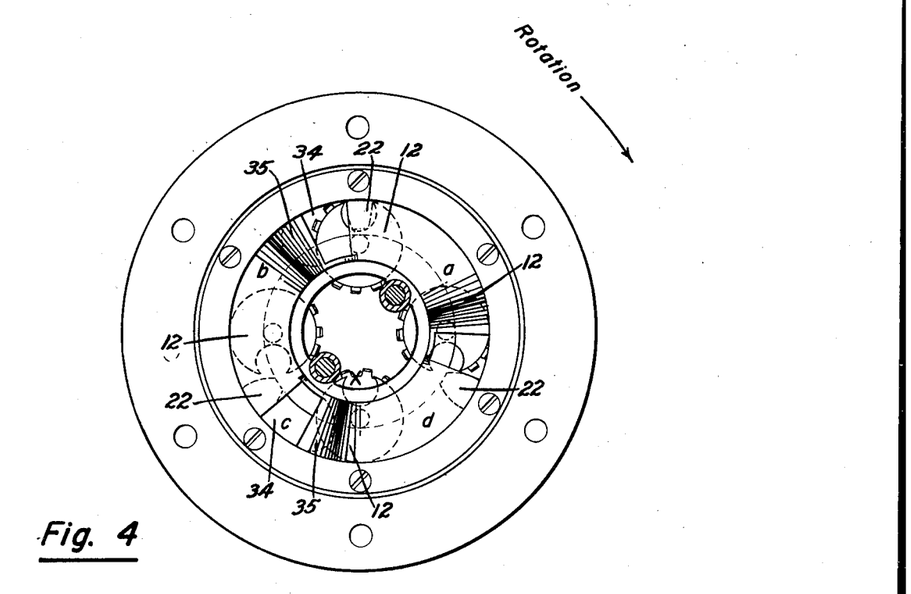
Fig. 4 is taken along line 4—4 of Fig. 1.
Figure 5:
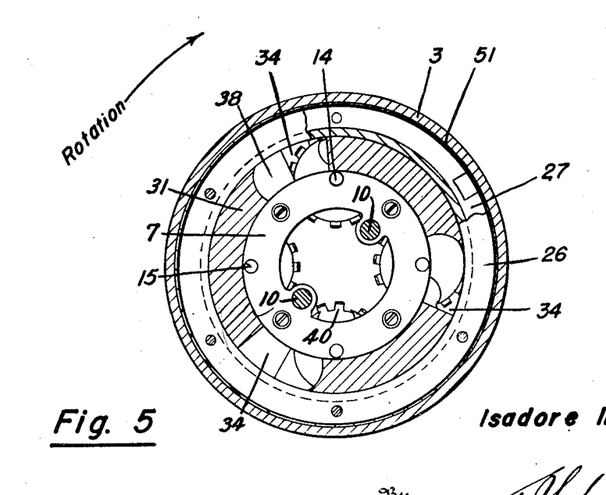
Fig. 5 is taken along line 5—5 of Fig. 1.
Figure 6:
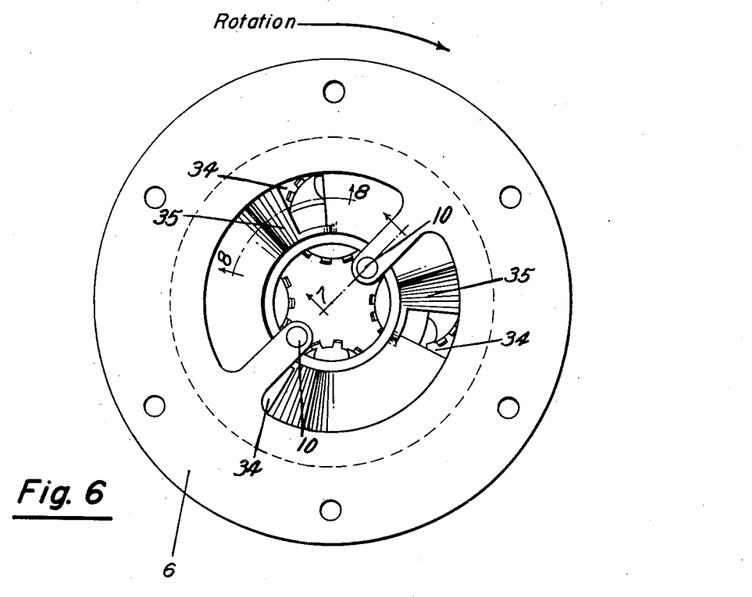
Fig. 6 is taken along line 6—6 of Fig. 1.

Thus it is apparent that as the pump shaft 18 is rotated each pump chamber a, b, c, d, at various intervals during the pump shaft rotation, goes through the following cycle of events. Communication is first established between the pump chambers and intake ports 34 and 37 and the impeller tooth 22 movement is such as to increase the volume of the pump chamber. There is then no flow communication with the impeller tooth channel 23. When the pump-chamber volume has reached its maximum value, impeller tooth 22 passes into a roller pocket 13. For a portion of the pump cycle thereafter there is no impeller tooth 22 in the pump chamber and flow communication between the pump chamber and the intake ports 34 and 37 is maintained (see Figs. 2 and 4, pump chamber b). It is noted that this feature of the pump; namely, that flow of fluid into the pump chamber can continue for an appreciable time after the full pump-chamber volume has been developed, is important to the maintenance of high pump delivery under conditions of low pressure at the pump inlet as during high-altitude aircraft flight. Further rotation of the impeller ring 19 moves intake ports 34 and 37 out of flow communication with the pump chamber just as the next succeeding impeller tooth 22 enters the pump chamber. The situation is that depicted in Figs. 2 and 4 by pump chamber a. A slight rotation of the pump places the pump chamber in flow communication with tooth channel 23 of impeller tooth 22. Still further movement of the impeller tooth 22 in the direction of rotation decreases the volume of the pump chamber as shown in Figs. 2 and 4 in pump chamber d, and causes a flow of liquid through tooth channel 23 and impeller-ring discharge channel 25 to discharge pipe 5.

By virtue of having scoops 35 and 38 on scoop plates 30 and 36 respectively, which rotate into the liquid being pumped, filling of the pump chambers a, b, c, and d, occurs with the benefit of the hydraulic ramming pressure caused by the motion of the scoop. The added intake pressure obtained in this manner, that is, by having dynamic intake ports, prevents cavitation of the liquid in said pump chamber even under conditions of operation involving low pressures at the pump inlet. Since the hydraulic ramming pressure increases with the square of the scoop speed through the fluid being pumped according to the well-known law:

$$Pressure = kdR^2$$

where $d$ is the density of the liquid being pumped, $R$ is the revolutions per second of the pump shaft, and $k$ is the constant of proportionality that depends on the pump dimensions, cavitation in the pump chambers does not occur at high pump rotational speeds and the pump delivery therefore increases in direct proportion with the pump rotational speed. Extremely high pumping rates, therefore, can be obtained with this pump.

It will be noted that cylindrical roller pockets 13 add to the total pump displacement. The cylindrical roller pockets 13 are emptied of fluid by the passage of impeller teeth 22. Immediately following the passage of impeller teeth 22 through pocket 13, said pocket 13 is exposed to intake ports 34 and 37 through which fluid flows into pocket 13 (Fig. 4). Pockets 13 are placed in flow communication with inlet fluid a second time during one revolution of cylindrical roller 12 when said pockets 13 open into passage 47 as at position X (Figs. 2 and 4). Complete filling of said pockets 13 by intake fluid is thus assured.

It will be noted that the torque transmitted by roller spur gears 40 to cylindrical rollers 12 is only that required to overcome the friction of cylindrical roller shafts 14 in stator-ring bearings 15 and 16. Roller spur gears 40 do not transmit energy required for pumping.

It will be further observed that the linear speed of the periphery of cylindrical rollers 12 and the inner surface 20 of impeller ring 19 are nominally the same, and at the point of contact or closest approach of cylindrical rollers 12 to impeller ring 19 there is negligible relative motion between said cylindrical roller and impeller ring. Wear is therefore reduced to a minimum.

Figure 9:
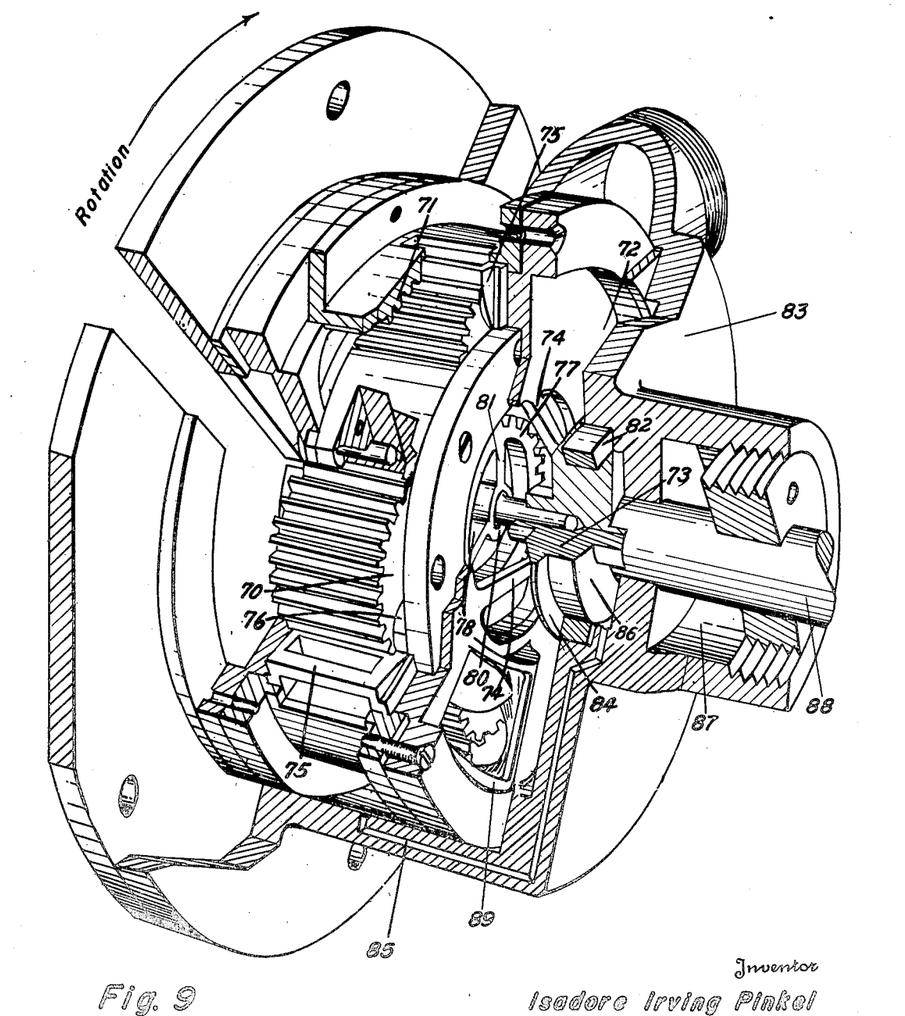
Fig. 9 is an isometric projection of a modified form of the pump from the drive shaft end cut away in parts to show the internal structure.
Figure 10:
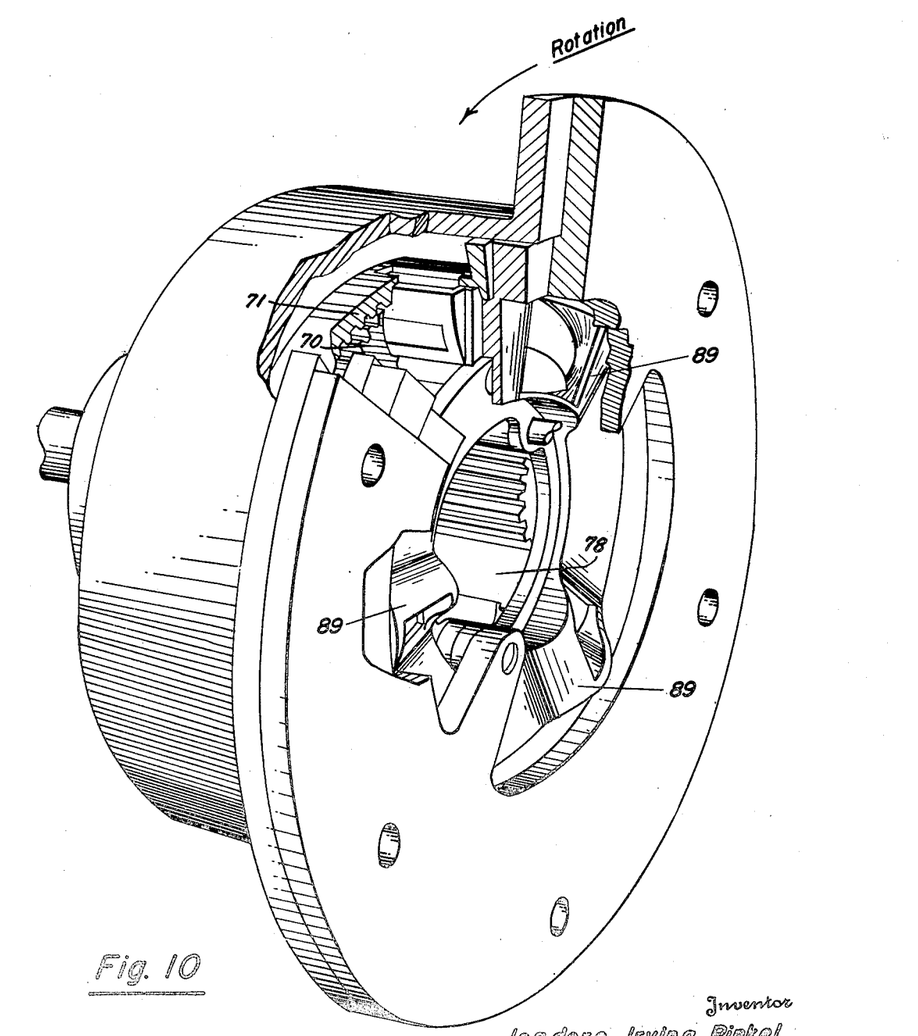
Fig. 10 is an isometric projection of the same pump shown in Fig. 9 from the fluid intake face with parts broken away.

In Figs. 9 and 10 are shown two isometric projections of an obvious modification of this invention, in which the cylindrical rollers 12 in Fig. 2 are modified to pinions 70, the impeller ring 19 (Fig. 2) is modified to ring gear 71, and scoop plate 36 (Figs. 1 and 3) is now a combined scoop plate and drive plate 72 which is rigidly attached to drive shaft 73 by means of spokes 74. Scoops 89 are shown in Figs. 9 and 10. The timing of the pinion pockets 76 with the impeller teeth 75 is fixed by the meshing of pinions 70 with ring gear 71. Roller spur gears 40 (Fig. 3) are no longer required. The pitch diameters of the pinion and ring gear are the same as the outside diameter of cylindrical roller 12 and impeller-ring inner surface 20 (Fig. 2) for pumps of the same nominal displacement volume.

Idler gear 77 (Fig. 9) meshes with all pinions 70, and said idler gear 77 serves to maintain the timing of the pinions 70 when they are momentarily out of mesh with ring gear 71 during the passage of an impeller tooth 75. There will always be at least one pinion 70 in mesh with both ring gear 71 and idler gear 77 so that said idler gear 77 remains properly phased with ring gear 71. Idler gear 77 is provided with a small hub 80 and thin spokes 81 so that the resistance to flow of fluids through stator channel 78 (Figs. 9 and 10) is kept as low as possible. The face width of idler gear 77 need be a fraction of the pinion 70 face width. Idler gear 77 is not required if pinion pocket 76 and impeller teeth 75 are properly formed to make a gear pair by which the passage of said impeller teeth 75 through pinion pocket 76 maintains the rotation of pinion 70 at the proper speed relative to the ring gear 71, so that proper meshing of the pinion 70 with ring gear 71 is established smoothly during the passage of the impeller tooth 75 through pinion pocket 76.

Bearing 82 (Fig. 9) is rigidly fixed in pump case 73 and said bearing 82 serves as a thrust bearing with shoulder 84 of scoop plate 72. Fluid pressure channel 85 is provided for those applications where it is desirable to maintain fluid at pump delivery pressure in chamber 86 to prevent the leakage of air or other gases into the pump along shaft 88 through packing gland 87, which would otherwise be maintained at pump inlet suction.

Direction of rotation of the modified version of pump shown in Figs. 9 and 10 is opposite to that illustrated in Figs. 1 to 8, inclusive, for purpose of illustration, and is not required by the modification in pump design.

The manner of operation of this pump is identical with that previously described.

Obvious modifications in form and details of construction may be made without departing from the spirit and scope of this invention, as defined in the appended claims.

The invention described herein may be manufactured and used by or for the Government of the United States of America for governmental purposes without the payment of any royalties thereon or therefor.

What is claimed is:

1. A rotary positive displacement pump comprising a pump case, an impeller rotatably mounted in said case, a stator concentric with said pump case and impeller, said stator being fixed relative to said pump case, one or more rotatable abutments mounted on said stator which, together with impeller teeth rigidly fixed to said impeller, form the radial limits to the pump chambers, which pump chambers alternately increase in volume and are subsequently reduced to substantially zero volume as the impeller teeth move away, through, and toward said rotary abutments, whose rotation is timed to permit the passage of said impeller teeth through suitably shaped pockets in said abutments, while maintaining liquid seal, rotary pump intake plates provided with one or more scoop shaped intakes having their openings facing in the direction of rotation whereby to create a hydraulic ram pressure to force fluid into the pump chambers as the intake openings move into the fluid being pumped, and at least one pump chamber outlet for each of said impeller teeth.

2. A pump of the class described characterized by having a pump casing, a chamber in an annular rotor, said annular rotor being rotatably mounted in said casing, a stator fixed to said casing and located within said annular rotor, the outer periphery of said stator being concentric with the axis of rotation of said annular rotor, said stator and annular rotor enclosing said chamber in a manner to provide a substantially leakproof running fluid seal at the boundaries of said chamber, teeth in said chamber fastened to said rotor and in sliding contact with the outer periphery of said stator, intake ports in said rotor in flow communication with said chamber during the chamber intake process, and discharge ports in said rotor in flow communication with said chamber during the discharge process.

3. A pump of the class described characterized by having a pump casing, a chamber in an annular rotor, said annular rotor being rotatably mounted in said casing, a stator fixed to said casing and located within said annular rotor, the outer periphery of said stator being concentric with the axis of rotation of said annular rotor, said stator and annular rotor enclosing said chamber in a manner to provide a substantially leakproof running fluid seal at the boundaries of said chamber, teeth in said chamber fastened to said rotor and in sliding contact with the outer periphery of said stator, one or more abutments mounted in said stator, the surfaces of said abutments being in close proximity to the bounding surfaces of said chamber in a manner to form substantially leak-proof seals while permitting relative motion between adjacent surfaces of said abutments and said stator and annular rotor, intake ports in said rotor in flow communication with said chamber during the chamber intake process, and discharge ports in said rotor in flow communication with said chamber during the discharge process.

4. A pump of the class described characterized by having a pump casing, a chamber in an annular rotor, said annular rotor being rotatably mounted in said casing, a stator fixed to said casing and located within said annular rotor, the outer periphery of said stator being concentric with the axis of rotation of said annular rotor, said stator and annular rotor enclosing said chamber in a manner to provide a substantially leakproof running fluid seal at the boundaries of said chamber, teeth in said chamber fastened to said rotor and in sliding contact with the outer periphery of said stator, one or more abutments rotatably mounted in said stator, the surfaces of said abutments being in close proximity to boundary surfaces of said chamber in a manner to form substantially leakproof seals while permitting relative motion between adjacent surfaces of said abutments and said stator and annular rotor, said abutments being provided with pockets to permit the smooth passage of said teeth through said abutment, means for synchronizing the rotation of said abutment with the movement of said teeth to accomplish the smooth passage of said teeth through said pockets while maintaining close clearance between said teeth and said pockets to provide a fluid seal, intake ports in said rotor in flow communication with said chamber during the chamber intake process, and discharge ports in said rotor in flow communication with said chamber during the discharge process.

5. A pump of the class described characterized by having a pump casing, a chamber in an annular rotor, said annular rotor being rotatably mounted in said casing, a stator fixed to said casing and located within said annular rotor, the outer periphery of said stator being concentric with the axis of rotation of said annular rotor, said stator and annular rotor enclosing said chamber in a manner to provide a substantially leakproof running fluid seal at the boundaries of said chamber, teeth in said chamber fastened to said rotor and in sliding contact with the outer periphery of said stator, intake ports in said rotor in flow communication with said chamber during the chamber intake process, said intake ports being provided with properly positioned and formed scoops to ram fluid into said inlet, and discharge ports in said rotor in flow communication with said chamber during the discharge process.

6. A pump of the class described characterized by having a pump casing, a chamber in an annular rotor, said annular rotor being rotatably mounted in said casing, a stator fixed to said casing and located within said annular rotor, the outer periphery of said stator being concentric with the axis of rotation of said annular rotor, said stator and annular rotor enclosing said chamber in a manner to provide a substantially leakproof running fluid seal at the boundaries of said chamber, teeth in said chamber fastened to said rotor and in sliding contact with outer periphery of said stator, one or more abutments rotatably mounted in said stator, the surfaces of said abutments being in close proximity to the boundary surfaces of said chamber in a manner to form substantially leakproof seals while permitting relative motion between adjacent surfaces of said abutments and said stator and annular rotor, said abutments being provided with pockets to permit the smooth passage of said teeth through said abutment, means for synchronizing the rotation of said abutment with the movement of said teeth to accomplish the smooth passage of said teeth through said pockets while maintaining close clearance between said teeth and said pockets to provide a fluid seal, intake ports in said rotor in flow communication with said chamber during the chamber intake process, said intake ports being proided with properly positioned and formed scoops to ram fluid into said inlet, and discharge ports in said rotor in flow communication with said chamber during the discharge process.

7. A pump of the class described characterized by having a casing, a rotor rotatably mounted in said casing, said rotor containing one or more pump chambers, means for varying cyclically the volumes of said pump chambers when said rotor is rotated, inlet ports in said rotor in flow communication with said pump chambers when said pump chamber volumes are increasing, scoops attached to said rotor for ramming fluid into said inlet ports during rotation of said rotor, and outlet ports in flow communication with said chambers when the volume of said pump chambers is decreasing.

8. A pump of the class described characterized by having a casing, a rotor rotatably mounted in said casing, said rotor containing one or more pump chambers, each of said pump chambers having as radial limits an impeller tooth and a rotary abutment shaped to permit passage of said impeller tooth, means including said tooth and abutment for varying cyclically the volume of each of said pump chambers when said rotor is rotated, means for performing said cyclical variation of the volume of each of said pump chambers several times during each rotor revolution to achieve a high pump displacement, inlet ports in said rotor in flow communication with each of said pump chambers when the volume of each of said pump chambers is increasing, and outlet ports in flow communication with each of said pump chambers when the volume of each of said pump chambers is decreasing.

9. A pump of the class described characterized by having a casing, rotor rotatably mounted in said casing, said rotor containing one or more pump chambers, means for varying cyclically the volume of each of said pump chambers, when said rotor is rotated, means for performing said cyclical variations of each of said pump chambers several times for each rotor revolution to achieve a high pump displacement for each rotor revolution, inlet ports in said rotor in flow communication with each of said pump chambers when the volume of each of said pump chambers is increasing, scoops attached to said rotor for ramming fluid into said inlet ports during rotation of said rotor, and outlet ports in flow communication with each of said pump chambers when the volume of each of said pump chambers is decreasing.

10. A pump of the type described comprising a casing, an annular impeller ring, annular end plates fastened to each side of said impeller ring, said annular impeller ring and annular end plate assembly being rotatably mounted in said casing, said annular impeller ring and annular end plate assembly being positioned relative to said casing to provide a leakproof seal in the proximity of the periphery of said annular impeller ring and annular end plate assembly, a stator ring mounted between said annular end plates and fastened to said casing with its outer periphery concentric with inner periphery of said impeller ring, one or more teeth fastened to inner periphery of said impeller ring and adapted to slide with low friction on the outer surface of said stator ring in a manner to provide a fluid seal between the adjacent surfaces of said tooth and said stator ring, one or more abutments supported in said stator ring and adapted to abut the inner periphery of said impeller ring in a manner to provide a fluid seal with low friction between said abutment and adjacent surface of said impeller ring and annular end plate assembly, said abutments being adapted to move in a manner to permit passage of the impeller teeth, but are otherwise inflexible against the pressure of the fluid within the annular space between said impeller ring and said stator ring, said impeller ring, annular end plates, teeth, stator ring, and abutments cooperating to form pump chambers, the volumes of which cyclically increase and decrease as said impeller ring and annular end plate assembly with said teeth are rotated with respect to said stator ring, the adjacent surfaces of the components forming said pump chambers having sufficiently small clearances to form substantially leakproof seals; one or more intake ports in either or both of said annular end plates in flow communication with said pump chambers during the pump chamber intake process, scoops attached to said annular end plates adapted to ram fluid into said intake ports when said annular end plates are rotated, discharge ports having their entrance at the leading faces of said teeth and passing through said impeller ring to the space between the outer periphery of said impeller ring and said pump casing, a discharge port in said casing in flow communication with said space between said impeller ring and pump casing.

11. A pump of the type described comprising a casing, an annular impeller ring, annular end plates fastened to each side of said impeller ring, said annular impeller ring and annular end plate assembly being rotatably mounted in said casing, said annular impeller ring and annular end plate assembly being positioned relative to said casing to provide a leakproof seal in the proximity of the periphery of said annular impeller ring and annular end plate assembly, a stator ring mounted between said annular end plates and fastened to said casing with its outer periphery concentric with the inner periphery of said impeller ring, one or more teeth fastened to the inner periphery of said impeller ring and adapted to slide with low friction on the outer surface of said stator ring in a manner to provide a fluid seal between the adjacent surfaces of said tooth and said stator ring, one or more abutments supported in said stator ring and adapted to abut the inner periphery of said impeller ring in a manner to provide a fluid seal with low friction between said abutment and adjacent surface of said impeller ring and annular end plate assembly, said abutments being adapted to move in a manner to permit passage of said teeth, but are otherwise inflexible against the pressure of the fluid within the annular space between said impeller ring and said stator ring, said abutments being rotatably mounted in said stator ring and provided with pockets to permit the smooth passage of said teeth while maintaining the desired fluid seals, said impeller ring, annular end plates, teeth, stator ring, and abutments cooperating to form pump chambers, the volumes of which cyclically increase and decrease as said impeller ring and annular end plate assembly with said teeth are rotated with respect to said stator ring, the adjacent surfaces of the components forming said pump chambers having sufficiently small clearances to form substantially leakproof seals; one or more intake ports in either or both of said annular end plates in flow communication with said pump chambers during the pump chamber intake process, scoops attached to said annular end plates adapted to ram fluid into said intake ports when said annular end plates are rotated, discharge ports having their entrance at the leading faces of said teeth anad passing through said impeller ring to the space between the outer periphery of said impeller ring and said pump casing, a discharge port in said casing in flow communication with said space between said impeller ring and pump casing.

12. A pump of the type described comprising a casing, an annular impeller ring, annular end plates fastened to each side of said impeller ring, said annular impeller ring and annular end plate assembly being rotatably mounted in said casing, said annular impeller ring and annular end plate assembly being positioned relative to said casing to provide a leakproof seal in the proximity of the periphery of said annular impeller ring and annular end plate assembly, a stator ring mounted between said annular end plates and fastened to said casing with its outer periphery concentric with inner periphery of said impeller ring, one or more teeth fastened to inner periphery of said impeller ring and adapted to slide with low friction on the outer surface of said stator ring in a manner to provide a fluid seal between the adjacent surfaces of said tooth and said stator ring, one or more abutments supported in said stator ring and adapted to abut the inner periphery of said impeller ring in a manner to provide a fluid seal with low friction between said abutment and adjacent surfaces of said impeller ring and annular end plate assembly, said abutments being adapted to move in a manner to permit passage of the impeller teeth, but are otherwise inflexible against the pressure of the fluid within the annular space between said impeller ring and said stator ring, said abutments being rotatably mounted in said stator ring and provided with pockets to permit the smooth passage of said teeth while maintaining the desired liquid seals, rotation of said abutments being synchronized with movement of said teeth by means attached to the abutment shaft which engage a suitable mechanical member attached to and rotating with, said impeller ring and annular end plate assembly, said impeller ring, annular end plates, teeth, stator ring, and abutments cooperating to form pump chambers, the volumes of which cyclically increase and decrease as said impeller ring and annular end plate assembly with said teeth are rotated with respect to said stator ring, the adjacent surfaces of the components forming said pump chambers having sufficiently small clearances to form substantially leakproof seals; one or more intake ports in either or both of said annular end plates in flow communication with said pump chambers during the pump chamber intake process, scoops attached to said annular end plates adapted to ram fluid into said intake ports when said annular end plates are rotated, discharge ports having their entrance at the leading faces of said teeth and passing through said impeller ring to the space between the outer periphery of said impeller ring and said pump casing, a discharge port in said casing in flow communication with said space between said impeller ring and pump casing.

13. A pump of the type described comprising a casing, an annular impeller ring, annular end plates fastened to each side of said impeller ring, said annular impeller ring and annular end plate assembly being rotatably mounted in said casing, said annular impeller ring and annular end plate assembly being positioned relative to said casing to provide a leakproof seal in the proximity of the periphery of said annular impeller ring and annular end plate assembly, a stator ring mounted between said annular end plates and fastened to said casing with its outer periphery concentric with the inner periphery of said impeller ring, one or more teeth fastened to the inner periphery of said impeller ring and adapted to slide with low friction on the outer surface of said stator ring in a manner to provide a fluid seal between the adjacent surfaces of said teeth and said stator ring, one or more abutments supported in said stator ring and adapted to abut the inner periphery of said impeller ring in a manner to provide a fluid seal with low friction between said abutment and the adjacent surfaces of said impeller ring and annular end plate assembly, said abutments being adapted to move in a manner to permit passage of the impeller teeth, but are otherwise inflexible against the pressure of the fluid within the annular space between said impeller ring and said stator ring, said abutments being rotatably mounted in said stator ring and provided with pockets to permit the smooth passage of said teeth while maintaining the desired fluid seal, rotation of said abutments being synchronized with movement of said teeth by gears attached to the shafts of said abutments, said gears being meshed with another gear rotating with said impeller ring and annular end plate assembly, said impeller ring, annular end plates, teeth, stator ring, and abutments cooperating to form pump chambers, the volumes of which cyclically increase and decrease as said impeller ring and annular end plate assembly with said teeth are rotated with respect to said stator ring, the adjacent surfaces of the components forming said pump chambers having sufficiently small clearances to form substantially leakproof seals; one or more intake ports in either or both of said annular end plates in flow communication with said pump chambers during the pump chamber intake process, scoops attached to said annular end plates adapted to ram fluid into said intake ports when said annular end plates are rotated, discharge ports having their entrance at the leading faces of said teeth and passing through said impeller ring to the space between the outer periphery of said impeller ring and said pump casing, a discharge port in said casing in flow communication with said space between said impeller ring and pump casing.

14. A pump of the type described comprising a casing, an annular impeller ring, annular end plates fastened to each side of said impeller ring, said annular impeller ring and annular end plate assembly being rotatably mounted in said casing, said annular impeller ring and annular end plate assembly being positioned relative to said casing to provide a leakproof seal in the proximity of the periphery of said annular impeller ring and annular end plate assembly, a stator ring mounted between said annular end plates and fastened to said casing with its outer periphery concentric with inner periphery of said impeller ring, one or more teeth fastened to inner periphery of said impeller ring and adapted to slide with low friction on the outer surface of said stator ring in a manner to provide a fluid seal between the adjacent surfaces of said tooth and said stator ring, one or more abutments supported in said stator ring and adapted to abut the inner periphery of said impeller ring in a manner to provide a fluid seal with low friction between said abutment and adjacent surface of said impeller ring and annular end plate assembly, said abutments being adapted to move in a manner to permit passage of the impeller teeth, but are otherwise inflexible against the pressure of the fluid within the annular space between said impeller ring and said stator ring, said abutments being pinions rotatably mounted in said stator ring and provided with pockets to permit the smooth passage of said teeth while maintaining the desired fluid seal, rotation of said abutments being synchronized with the movement of said teeth by meshing of said pinion with a ring gear on the inner periphery of said annular ring, said impeller ring, annular end plates, teeth, stator ring, and abutments cooperating to form pump chambers, the volumes of which cyclically increase and decrease as said impeller ring and annular end plate assembly with said teeth are rotated with respect to said stator ring, the adjacent surfaces of the components forming said pump chambers having sufficiently small clearances to form substantially leakproof seals; one or more intake ports in either or both of said annular end plates in flow communication with said pump chambers during the pump chamber intake process, scoops attached to said annular end plates adapted to ram fluid into said intake ports when said annular end plates are rotated, discharge ports having their entrance at the leading faces of said teeth and passing through said impeller ring to the space between the outer periphery of said impeller ring and said pump casing, a discharge port in said casing in flow communication with said space between said impeller ring and pump casing.

15. A pump comprising a casing, a rotor mounted therein having a drive connection accessible through one end of said casing, an internal ring gear on said rotor, an annular stator mounted in said casing having a peripheral cylindrical wall, a spider support at the other end of said casing for said stator, an internally opening annular groove on said rotor closely fitting around said peripheral cylindrical wall to form an annular chamber, said rotor having two or more abutments extending radially inwardly in said groove at annularly equally spaced intervals to divide said annular chamber into two or more arcuate spaces respectively, gear elements meshing with said internal ring gear rotatably mounted in said stator at equally spaced annular intervals and having a gear ratio equal to the number of abutments, there being one more gear member than this number, and portions of said gear elements forming rotary abutments closely fitting in said annular chamber cooperating with said rotor abutments to form a moving seal between adjacent arcuate spaces while permitting said abutments to pass each other, the side walls of said annular groove having inlets for said arcuate spaces adjacent the trailing sides of said rotor abutments, scoops for said inlets formed outwardly of said side walls, outlets for said arcuate spaces on the leading side of said rotor abutments, an outer annular groove in said rotor having connecting passages in said abutments to said outlets, and a delivery connection connecting with said annular groove.

16. A pump comprising a casing, a rotor mounted therein having a drive connection accessible from one end of said casing, an internal ring gear on said rotor, a stator mounted in said casing having a peripheral cylindrical wall, a spider support at the other end of said casing for said stator, two or more abutments on said rotor extending radially inwardly of said ring gear at angularly equally spaced intervals, annular end walls on said rotor joining said abutments for the angular spaces between them, a cylindrical wall on said stator forming the inner wall of said spaces, gear elements meshing with said internal ring gear rotatably mounted in said stator at equally spaced angular intervals and having a gear ratio with respect to said ring gear equal to the number of abutments, there being one more gear member than this number, portions of said gear elements forming rotary abutments closely fitting in said spaces with cutout pockets in their peripheries cooperating with said rotor abutments to form a moving seal between adjacent spaces as the rotor abutments rotate past said rotary abutments while permitting said abutments to pass each other, said end walls having inlets adjacent the trailing sides of said rotor abutments, scoops for said inlets formed outwardly of said end walls, outlets for said spaces on the leading faces of said rotor abutments, an outer annular groove in said rotor connected to said outlets and a pump discharge connection at the periphery of said casing in communication with said annular groove.

17. A fluid pump comprising a casing having a plurality of equal arcuate spaces formed between a stationary element and a rotary element by an annular groove separated by abutments in the rotary element and a closely fitting annular closing ring on the stationary element, a plurality of rotary abutments comprising one more than the number of groove abutments in the rotary element, equally spaced on said stationary element and having outer spaces of revolution formed by elements shaped to fit closely into the section of said annular groove, said rotary abutments having cut-out pockets in their peripheries to cooperate with said groove abutments to form a moving seal between adjacent arcuate spaces as the elements are rotated past each other, inlet passages with scoops in the opposite side walls of said annular groove for each of said arcuate spaces adjacent the trailing edges of said groove abutments, outlet passages in the leading faces of said groove abutments connected to a common annular chamber in the periphery of said casing, a delivery connection in the outer wall of said casing communicating with said annular chamber, a drive connection for said rotary element in one end of said casing and a central inlet opening communicating with said inlet passages in the other end of said casing.

18. A rotary fluid pump comprising a casing, a rotary and stationary element therein forming a series of annularly arranged pumping spaces between them separated by abutments fixed in said rotary element, rotary abutments in said stationary element numbering one more than the number of said spaces and having cut-out pockets for cooperation with said separating abutments to permit the separating abutments to pass said rotary abutments without breaking the fluid seal between adjacent pumping spaces, means on said rotary element for rotating said rotary abutments to bring the cut-out pockets in mesh with said separating abutments as they pass each other, a central pump inlet at one end of said casing, said abutments fixed in said rotary element protruding radially inwardly and having outlet passages therein leading to a peripheral outlet chamber in said casing, and a pump outlet in the periphery of said casing.

19. A rotary fluid pump comprising a casing, a rotary and stationary element therein forming a series of annularly arranged pumping spaces between them separated by abutments fixed in said rotary element, rotary abutments in said stationary element numbering one more than the number of said spaces and having cut-out pockets for cooperation with said separating abutments to permit the separating abutments to pass said rotary abutments without breaking the fluid seal between adjacent pumping spaces, means on said rotary element for rotating said rotary abutments to bring the cut-out pockets in mesh with said separating abutments as they pass each other, a central pump inlet at one end of said casing, a pump outlet in the periphery of said casing, scoop shaped inlet passages in the opposite walls of said pumping spaces adjacent the trailing edges of said separating abutments and in communication with the pump inlet.

20. A rotary fluid pump comprising a casing, a rotary and stationary element therein forming a series of annularly arranged pumping spaces between them separated by abutments fixed in said rotary element, rotary abutments in said stationary element numbering one more than the number of said spaces and having cut-out pockets for cooperation with said separating abutments to permit the separating abutments to pass said rotary abutments without breaking the fluid seal between adjacent pumping spaces, means on said rotary element for rotating said rotary abutments to bring the cut-out pockets in mesh with said separating abutments as they pass each other, a central pump inlet at one end of said casing, a pump outlet in the periphery of said casing, scoop shaped inlet passages in the opposite walls of said pumping spaces adjacent the trailing edges of said separating abutments and in communication with the pump inlet, and outlet passages in said separating abutments having ports to the pumping spaces in the leading faces of said abutments and communicating with said pump outlet through a common peripheral chamber in said casing.

21. A rotary positive displacement pump comprising a case, an impeller rotatably mounted in said case, said impeller being provided with one or more annularly spaced impeller teeth, a stator concentric with said impeller having a greater number of annularly spaced rotary abutments than said impeller teeth for successive cooperation of each tooth with each abutment to form variable volume annular pump chambers therebetween, in order that the fluid being pumped be brought substantially to rest in said pump chambers previous to the completion of each intake cycle, said impeller teeth and rotary abutments forming the radial limits of said pump chambers, said pump chambers being provided with one or more inlets fitted with scoops on said impeller which rotate into the fluid being pumped to provide hydraulic ram pressure at the pump chamber inlets to assist the flow of fluid into said pump chambers.

22. A rotary positive displacement pump comprising a case, an impeller rotatably mounted in said case, said impeller being provided with one or more annularly spaced impeller teeth, a stator having a greater number of annularly spaced rotary abutments than said impeller teeth for successive cooperation of each tooth with each abutment to form variable volume annular pump chambers therebetween, said impeller teeth and rotary abutments forming the radial limits of said annular pump chambers formed therebetween, said pump chambers being provided with one or more inlets timed to be full open when the full pump chamber volume is developed, said inlets being fitted with scoops on said impeller which rotate into the fluid being pumped to provide hydraulic ram pressure at the pump chamber inlets.

ISADORE IRVING PINKEL.

REFERENCES CITED

The following references are of record in the file of this patent:

UNITED STATES PATENTS

| Number | Name | Date |
|---|---|---|
| 1,088,836 | Nielsen | Mar. 3, 1914 |
| 1,408,839 | Sparrow | Mar. 7, 1922 |
| 1,524,447 | Molinari | Jan. 27, 1925 |
| 2,016,812 | Benedek | Oct. 8, 1935 |

FOREIGN PATENTS

| Number | Country | Date |
|---|---|---|
| 376,162 | Great Britain | of 1932 |